Patented Aug. 7, 1951

2,563,442

UNITED STATES PATENT OFFICE 2,563,442

PROCESS FOR THE MANUFACTURE OF ZINC PEROXIDE

William Stanley Wood, Harpenden, and George Clennett, Luton, England, assignors to Laporte Chemicals Limited, a British company No Drawing. Application January 25, 1947, Serial No. 724,458. In Great Britain February 4, 1946

10 Claims. (Cl. 23—147)

This invention relates to a process for the manufacture of zinc peroxide.

Two main processes have been previously proposed for the manufacture of zinc peroxide. In the first of these zinc oxide was mixed with concentrated hydrogen peroxide to form a paste which was then dried. If a higher content of active oxygen was required the dried product was treated several times with hydrogen peroxide. Such a process, however, gives a low oxygen efficiency and presents difficulties in producing the maximum oxygen content in the finished product. Also owing to the considerable handling of the product the process is time-consuming and unsuitable for large scale production. In the second main process an alkaline solution of a zinc salt was precipitated with hydrogen peroxide. The resultant peroxide, however, is slimy and difficult to filter on a large scale and the product is not stable.

It is an object of the present invention to provide an improved process for the manufacture of zinc peroxide having certain advantages hereinafter referred to.

With this object in view the present invention provides a process for the manufacture of zinc peroxide wherein zinc oxide or zinc hydroxide is added in several portions to a solution of hydrogen peroxide containing an acid which forms a water-soluble salt with zinc oxide or zinc hydroxide or a water-soluble zinc salt to give a precipitate of zinc peroxide the amount of each portion added being small in comparison with the total of the hydrogen peroxide measured molecularly.

As acid we prefer to use hydrochloric acid, nitric acid or sulphuric acid and we prefer to add 2 to 25 gms. of acid or water-soluble zinc salt per litre of the hydrogen peroxide solution.

The zinc oxide or zinc hydroxide and the hydrogen peroxide are preferably present in equimolecular proportions since an excess of hydrogen peroxide leads to a loss in oxygen efficiency.

We prefer to use a ratio of zinc oxide to solution of from 1:3 to 1:7 or a corresponding ratio of zinc hydroxide. This of course depends on the hydrogen peroxide concentration, i. e. the higher the hydrogen peroxide concentration the higher the ratio of solid to liquid.

It was found that it is advantageous to have a certain amount of acid which forms a water-soluble salt with zinc oxide or zinc hydroxide or water-soluble zinc salt present in the hydrogen peroxide solution. When the acid is present this dissolves some of the zinc oxide or zinc hydroxide and when this is precipitated as zinc peroxide, the acid is liberated. The acid or water-soluble zinc salt thus serves to initiate and catalyse the reaction.

Thus the probable course of the reaction in the case of sulphuric acid is that the acid first attacks the zinc oxide:

$$ZnO + H_2SO_4 = ZnSO_4 + H_2O \qquad (1)$$

The hydrogen peroxide then reacts with the zinc sulphate:

$$ZnSO_4 + H_2O_2 = ZnO_2 + H_2SO_4 \qquad (2)$$

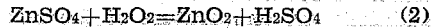

Thus the acid is regenerated and reaction (1) again takes place. In the case of the addition of a water soluble zinc salt the reactions are the same but presumably reaction (2) takes place first.

The process of the present invention is preferably conducted at an increased temperature as this results in a product of a satisfactory granular nature. The beneficial action of the acid is also most marked at an increased temperature. Thus we do not cool the reaction vessel but allow the temperature to be increased by the heat of the reaction. The reaction is preferably conducted at above 30° C. but the temperature should not be allowed to rise above 70° C. owing to decomposition. The reaction can for example be conducted at 50° C. with the zinc peroxide slurry cooled to 35° C. for filtration to prevent oxygen loss during this process.

The process is preferably conducted with hydrogen peroxide solutions of such concentration that the heat generated by the reaction is sufficient to raise the temperature of the reaction mixture to the preferred point. If the solution is too concentrated the temperature will be too high and if too dilute insufficient heat will be available. Also the more dilute the hydrogen peroxide solution the more liquor there is to handle, while if the concentration of the solution of hydrogen peroxide is too high the resulting slurry will be too thick to handle.

It was found that a satisfactory range of concentration of the hydrogen peroxide is from about 10% to 15% by weight e. g. 12%. The temperature can be controlled to a certain extent by the rate of addition of the zinc oxide or zinc hydroxide to the hydrogen peroxide.

Although the process of the present invention can be conducted satisfactorily without the presence of stabiliser in the reaction it was found that the addition of such a stabiliser improved the stability of the finished product. For example, it was found that the addition of sodium silicate to the reaction mixture considerably improved the stability of the resultant zinc peroxide.

The reaction in the present invention takes only a short time to go to completion and this point is indicated when a filtered sample of the mother liquor shows a negligible quantity of hydrogen peroxide.

When the reaction is completed as shown by the absence of hydrogen peroxide in the mother liquor the zinc peroxide is filtered off, washed free from soluble salts, and dried. A granular stable product is obtained and this may be ground in a suitable mill if a finer product is required.

The process of the present invention has a number of advantages. Thus it reduces the amount of material to be handled, no external heat and very little cooling is required, the losses due to decomposition are reduced to a minimum and the properties and stability of the finished product are satisfactory in every respect.

The following examples illustrate how the process of the invention may be carried into effect:

1. 120 gals. of water were mixed with 896 lbs. of hydrogen peroxide (27.6% by weight) to give 2096 lbs. of a solution containing 11.8% of hydrogen peroxide. To this solution 10 lbs. of concentrated sulphuric acid was then added.

600 lbs. of zinc oxide was then added to the above solution in 6 equal additions at approximately 5-minute intervals. At the end of the additions the temperature of the reaction mixture was 51° C. An addition of 1.75 lbs. of sodium silicate (78° Tw. $Na_2O:SiO_2=1:3.4$) was then made to the reaction mixture. The mixture was then cooled to 35/40° C. and the zinc peroxide was separated in a centrifuge.

The zinc peroxide pulp was washed free from soluble sulphates, removed from the centrifuge and dried at 90–100° C. for 6 hours.

The final yield was 760 lbs. of zinc peroxide containing 66.2% of $ZnO_2$. The oxygen efficiency was 71%.

2. 29 gals. of water were mixed with 232 lbs. of hydrogen peroxide (27.6% w./w.) to give 522 lbs. of a solution containing 12.4% by wt. of hydrogen peroxide. To this solution 7 lbs. of concentrated nitric acid (S. O. 1.42) was then added.

150 lbs. of zinc oxide was then added in five equal additions at approximately 5 minute intervals. After the additions the temperature of the reaction mixture was 34° C. An addition of 3.5 lbs. of sodium silicate (78° Tw. $Na_2O:SiO_2=1:3.4$) was then made to the reaction mixture. The mixture was then cooled to 28° C. and the zinc peroxide removed in a centrifuge.

The zinc peroxide was washed free from soluble salt, removed from the centrifuge and dried at 100° C. for 5 hours.

The yield was 190 lbs. of zinc peroxide containing 62.0% of $ZnO_2$. The oxygen efficiency was 65%.

3. 29 gals. of water were mixed with 232 lbs. of hydrogen peroxide (27.6% w./w.) to give 522 lbs. of a solution containing 12.4% w./w. of hydrogen peroxide. To this solution 5.0 lbs. of zinc nitrate was added.

150 lbs. of zinc oxide was then added to the above solution in five equal additions at approximately 5 minute intervals. At the end of the additions the temperature of the reaction mixture was 36° C. An addition of 3.5 lbs. of sodium silicate (78° Tw. $Na_2O:SiO_2=1:3.4$) was then made to the reaction mixture. The mixture was then cooled to 32° C. and the zinc peroxide was removed by centrifuging.

The zinc peroxide pulp was washed free from soluble salts, removed from the centrifuge and dried at 100° C. for 5 hours.

The final yield was 189 lbs. of zinc peroxide containing 66.5% of $ZnO_2$. The oxygen efficiency was 68.9%.

The total oxygen efficiency given in the examples is calculated on the $ZnO_2$ yields only and takes no account of the residual oxygen in the mother liquor.

We claim:

1. A process for the manufacture of zinc peroxide which comprises reacting hydrogen peroxide in a 10 to 15% by weight aqueous solution containing 2 to 25 grams per liter of a substance selected from the group consisting of water-soluble zinc salts and acids which form water-soluble zinc salts with a zinc compound selected from the group consisting of zinc oxide and zinc hydroxide at a temperature in the range of about 30°–70° C. to produce a granular precipitate of zinc peroxide, the zinc compound being added in several portions each of which is small in comparison with the total of the hydrogen peroxide present in said solution and the intervals between successive additions being regulated so as to keep the temperature in the reaction zone below about 70° C.

2. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. per liter of solution of a substance selected from the group consisting of water soluble zinc salts and acids which form water soluble zinc salts, said zinc compound being added in several portions each of which is small in comparison with the total of the hydrogen peroxide present in said solution, and controlling the rate of addition of said portions so as to maintain the temperature of the reaction mixture below about 70° C., thereby forming a granular precipitate of zinc peroxide.

3. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of hydrochloric acid per liter of solution while maintaining the temperature in the range 30–70° C., said zinc compound being added in several portions each of which is small in comparison with the total of the hydrogen peroxide present in said solution, and controlling the rate of addition of said portions so as to maintain the temperature of the reaction mixture below about 70° C., and thereby producing a granular precipitate of zinc peroxide.

4. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of sulphuric acid per liter of solution while maintaining the temperature in the range 30–70° C., said zinc compound being added in several portions each of which is small in comparison with the total of the hydrogen peroxide present in said solution, and controlling the rate of addition of said portions so as to maintain the temperature of the reaction mixture below about 70° C., and thereby producing a granular precipitate of zinc peroxide.

5. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of nitric acid per liter of solution while maintaining the temperature in the range 30–70° C., said zinc compound being added in several portions each of which is small in comparison with the total of the hydrogen peroxide present in said solution, and controlling the rate of addition of said portions so as to maintain the temperature of the reaction mixture below about 70° C., and thereby producing a granular precipitate of zinc peroxide.

6. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. per liter of solution of a substance selected from the group consisting of water soluble zinc salts and acids which form water soluble zinc salts, while maintaining the temperature in the range 30–70° C., said zinc compound being added in several portions each of which is small in comparison with the total of the hydrogen peroxide present in said solution and said additions being so spaced as to maintain the temperature of the reaction mixture below about 70° C., and continuing said additions until the proportion by weight of zinc compound calculated as zinc peroxide equals from one-third to one-seventh of the weight of the solution, thereby producing a granular precipitate of zinc peroxide.

7. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of hydrochloric acid per liter of solution, while maintaining the temperature in the range 30–70° C., said zinc compound being added in several portions each of which is small in comparison with the total of the hydrogen peroxide present in said solution and said additions being so spaced as to maintain the temperature of the reaction mixture below about 70° C., and continuing said additions until the proportion by weight of zinc compound calculated as zinc peroxide equals from one-third to one-seventh of the weight of the solution, and thereby producing a granular precipitate of zinc peroxide.

8. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of sulphuric acid per liter of solution, while maintaining the temperature in the range 30–70° C., said zinc compound being added in several portions each of which is small in comparison with the total of the hydrogen peroxide present in said solution and said additions being so spaced as to maintain the temperature of the reaction mixture below about 70° C., and continuing said additions until the proportion by weight of zinc compound calculated as zinc peroxide equals from one-third to one-seventh of the weight of the solution, and thereby producing a granular precipitate of zinc peroxide.

9. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. of nitric acid per liter of solution, while maintaining the temperature in the range 30–70° C., said zinc compound being added in several portions each of which is small in comparison with the total of the hydrogen peroxide present in said solution and said additions being so spaced as to maintain the temperature of the reaction mixture below about 70° C., and continuing said additions until the proportion by weight of zinc compound calculated as zinc peroxide equals from one-third to one-seventh of the weight of the solution, and thereby producing a granular precipitate of zinc peroxide.

10. A process for the manufacture of zinc peroxide which comprises adding a zinc compound selected from the group consisting of zinc oxide and zinc hydroxide to a 10 to 15% by weight aqueous solution of hydrogen peroxide containing from 2 to 25 gms. per liter of solution of a substance selected from the group consisting of water soluble zinc salts and acids which form water soluble zinc salts, so controlling the rate of addition of the zinc compound as to maintain the temperature in the reaction zone between 30 and 70° C., and continuing said additions until the proportion by weight of zinc compound calculated as zinc peroxide equals from one-third to one-seventh of the weight of the solution, and thereby producing a granular precipitate of zinc peroxide.

WILLIAM STANLEY WOOD.
GEORGE CLENNETT.

REFERENCES CITED

The following references are of record in the file of this patent:

UNITED STATES PATENTS

| Number | Name | Date |
| --- | --- | --- |
| 2,304,104 | Klabunde et al. | Dec. 8, 1942 |
| 2,393,891 | Dawsey et al. | Jan. 29, 1946 |

OTHER REFERENCES

Mellor's, "A Comprehensive Treatise on Inorganic and Theoretical Chemistry," vol. 4, pages 530, 531, 613, 614. Longmans, Green & Co., N. Y., publishers.